US007383490B2

United States Patent
Almasi et al.

(10) Patent No.: US 7,383,490 B2
(45) Date of Patent: Jun. 3, 2008

(54) METHODS AND APPARATUS USING COMMUTATIVE ERROR DETECTION VALUES FOR FAULT ISOLATION IN MULTIPLE NODE COMPUTERS

(75) Inventors: Gheorghe Almasi, Ardsley, NY (US); Matthias Augustin Blumrich, Ridgefield, CT (US); Dong Chen, Croton-On-Hudson, NY (US); Paul Coteus, Yorktown, NY (US); Alan Gara, Mount Kisco, NY (US); Mark E. Giampapa, Irvington, NY (US); Philip Heidelberger, Cortlandt Manor, NY (US); Dirk I. Hoenicke, Ossining, NY (US); Sarabjeet Singh, Mississauga (CA); Burkhard D. Steinmacher-Burow, Wernau (DE); Todd Takken, Brewster, NY (US); Pavlos Vranas, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/106,069

(22) Filed: Apr. 14, 2005

(65) Prior Publication Data
US 2006/0248370 A1    Nov. 2, 2006

(51) Int. Cl.
*G06F 11/00* (2006.01)
*H03M 13/00* (2006.01)
(52) U.S. Cl. .................. 714/800; 714/770; 714/758; 714/100

(58) Field of Classification Search ............. 714/4, 714/100, 800, 821, 712
See application file for complete search history.

(56) References Cited

U.S. PATENT DOCUMENTS 3,451,042 A * 6/1969 Jensen et al. .............. 714/4
4,982,401 A * 1/1991 Box ...................... 714/701
7,278,083 B2 * 10/2007 Haswell et al. ............ 714/758

* cited by examiner

Primary Examiner—Guy J. Lamarre
(74) Attorney, Agent, or Firm—Harrington & Smith, PC

(57) ABSTRACT

Methods and apparatus perform fault isolation in multiple node computing systems using commutative error detection values for—example, checksums—to identify and to isolate faulty nodes. When information associated with a reproducible portion of a computer program is injected into a network by a node, a commutative error detection value is calculated. At intervals, node fault detection apparatus associated with the multiple node computer system retrieve commutative error detection values associated with the node and stores them in memory. When the computer program is executed again by the multiple node computer system, new commutative error detection values are created and stored in memory. The node fault detection apparatus identifies faulty nodes by comparing commutative error detection values associated with reproducible portions of the application program generated by a particular node from different runs of the application program. Differences in values indicate a possible faulty node.

41 Claims, 5 Drawing Sheets

METHODS AND APPARATUS USING COMMUTATIVE ERROR DETECTION VALUES FOR FAULT ISOLATION IN MULTIPLE NODE COMPUTERS

STATEMENT OF GOVERNMENT RIGHTS

The invention was made in part under Contract No. W-7405-ENG-48, Subcontract No. B517552, U.S. Department of Energy. Accordingly, the Government has certain rights in this invention.

TECHNICAL FIELD

The present invention generally concerns methods and apparatus for performing fault identification and isolation in multiple node computing systems and more particularly concerns methods and apparatus using commutative error detection values for identifying and isolating faulty nodes in multiple node computing systems.

BACKGROUND

In a multiple node computer, such as BlueGene/L, the ability to isolate faulty hardware is essential. For example, a chip may be operating near the edge of its acceptable environmental limits, for example, clock frequency, voltage or temperature. A temporary change in one of these environmental factors may cause the node to compute an incorrect value, for example, when performing a floating point operation. Such an incorrect value is an undetected error, or fault, and can cause the results of the entire operation to be invalid. In many cases the error is transient, and does not repeat when the calculation is re-run. These types of errors can be extremely difficult to find. Further, a bad calculation on one node can quickly propagate, for example, through message passing, to other nodes in a massively parallel computer, masking the original source of the error. In such cases, it is extremely difficult to identify the faulty node.

Diagnostic hardware tests can frequently be run to detect such faults (by comparing computed results to known correct values), however they may stress the hardware in different ways than real applications. Further, diagnostic hardware tests cannot easily find and isolate a transient error, and they may not be able to find the source of a propagating error.

Checksums are routinely used for fault identification, such as in TCP in which a message spanning multiple packets is checksummed. The checksum is usually sent at the end of a message. The receiver of the message computes the checksum as the message arrives and compares its computed value to the value transmitted by the sender. If a difference occurs, the message is known to be in error and can be retransmitted. However, this only identifies faulty message transmission and does not identify whether or not bad data is sent as part of the message due to a faulty computation.

Triple modular redundancy (TMR) uses extra hardware and comparators to compare the results of the same computation done by redundant hardware components. A voting mechanism is used to determine which of the components are correct, and to isolate out faulty components. However, this is a much more costly solution (in terms of hardware) than injection checksums.

Thus, those skilled in the art desire methods and apparatus for identifying and isolating node faults in multiple node computing systems, in particular node faults which may be of a transient, or non-repeating, nature. In contrast to methods of the prior art that use fault diagnostic programs not operable during execution of actual application programs, those skilled in the art desire fault detection methods and apparatus that operate during execution of application programs. In such methods and apparatus there would be no question as to whether a fault diagnostic program would successfully identify a node likely to fail during execution of an application program, since the methods and apparatus of such a system would perform fault identification using actual runs of the application program. Thus, fault conditions created by combinations of factors only encountered during execution of an application program would be detected.

In addition, those skilled in the art desire methods and apparatus for identifying and isolating faulty nodes in multiple node computing systems that can source the initial fault condition to the node or nodes which generated it. Often, methods and apparatus of the prior art do not take the architecture of a multiple node computing system into consideration and are, therefore, incapable of identifying with particularity which node or nodes of the system originated the fault condition.

Further, those skilled in the art desire methods and apparatus for identifying and isolating faulty nodes in multiple node computing systems that are capable of identifying which portion of an application program resulted in a fault condition when executed. Methods and apparatus incapable of making such identification are less useful as diagnostic tools.

Finally, those skilled in the art desire methods and apparatus for identifying and isolating faulty nodes in multiple node computing systems that are flexible, inexpensive, and can be adapted for use in combination with many different application programs. Ideally, the methods would be of such universal applicability and ease of use that they can be applied during creation of application programs. Such methods and apparatus would not require the creation of separate fault detection routines in a costly and expensive separate software authoring step. Rather, the fault detection steps could be incorporated into the application program itself.

SUMMARY OF THE PREFERRED EMBODIMENTS

The foregoing and other problems are overcome, and other advantages are realized, in accordance with the following embodiments of the present invention.

A first alternate embodiment of the present invention comprises a signal-bearing medium tangibly embodying a program of machine-readable instructions executable by a digital processing apparatus to perform node fault detection operations in a computing system using commutative error detection values, where the computing system comprises a plurality of nodes, where each of the nodes comprises at least a node processor, a node memory, a network interface and a commutative error detection apparatus; the computing system further comprising a network connecting the plurality of nodes through the network interfaces of the nodes, and wherein node fault detection occurs when the computing system executes at least a portion of an application program at least twice, wherein during each execution of the portion of the application program at least one commutative error detection value is generated and saved to the commutative error detection apparatus associated with at least one node of the plurality when data generated during execution of a reproducible segment of the portion of the application program is injected into the network by the at least one node, the node fault detection operations comprising: retrieving the at least one commutative error detection value generated during a first execution of the portion of the application program from the commutative error detection apparatus of the at least one node; saving the at least one commutative error detection value associated with the first execution of the portion of the application program to a computer memory medium; retrieving the at least one commutative error detection value generated during a second execution of the portion of the application program from the commutative error detection apparatus of the at least one node; and comparing the at least one commutative error detection value from the first execution of the portion of the application program to the at least one commutative error detection value from the second execution of the portion of the application program.

A second alternate embodiment of the present invention comprises a signal-bearing medium tangibly embodying a program of machine-readable instructions executable by a digital processing apparatus to perform node fault detection operations in a computing system using commutative error detection values, where the computing system comprises a plurality of nodes, where each of the nodes comprises at least a node processor, a node memory, a network interface and a commutative error detection apparatus; the computing system further comprising a network connecting the plurality of nodes through the network interfaces of the nodes, and wherein node fault detection occurs when the computing system executes multiple portions of an application program at least twice, wherein during each execution of the multiple portions of the application program a plurality of commutative error detection values are generated and saved to the respective commutative error detection apparatus associated with the plurality of nodes when data generated during execution of reproducible segments of the multiple portions of the application program is injected into the network by the nodes, the node fault detection operations comprising: during the first execution and second executions of the multiple portions of the application program, retrieving the commutative error detection values from the commutative error detection apparatus associated with the plurality of nodes; saving the plurality of commutative error detection values associated with at least the first execution of the multiple portions of the application program to a computer memory medium; and comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition.

A third alternate embodiment of the present invention comprises node fault detection apparatus for use in a computing system, where the computing system comprises a plurality of nodes, where each of the nodes comprises at least a node processor, a node memory, a network interface and a commutative error detection apparatus; and a network connecting the plurality of nodes through the network interfaces of the nodes, the node fault detection apparatus comprising: at least one node fault detection processor for performing node fault detection operations; a node fault detection memory for storing commutative error detection values retrieved from the commutative error detection apparatus of the plurality of nodes; and a network interface connecting the node fault detection apparatus to the network of the computing system, where the at least one processor of the node fault detection apparatus performs at least the following node fault detection operations when the computing system executes a portion of an application program at least twice, wherein during each execution of the portion of the application program at least one commutative error detection value is generated and saved to a commutative error detection apparatus associated with at least one node of the plurality when data generated during execution of a reproducible segment of the portion of the application program is injected into the network by the at least one node, the node fault detection operations comprising: retrieving the at least one commutative error detection value created during a first execution of the application program from the commutative error detection apparatus of the at least one node; saving the at least one commutative error detection value from the first execution of the application program to the node fault detection apparatus computer memory medium; retrieving the at least one commutative error detection value created during a second execution of the application program from the commutative error detection apparatus of the at least one node; and comparing the at least commutative error detection value from the first execution of the application program to the at least one commutative error detection value from the second execution of the application program.

A fourth alternate embodiment of the present invention comprises computing system using commutative error detection values for node fault detection, the computing system comprising: a plurality of nodes, where each of the nodes comprises at least a node processor, a node memory, a network interface and a commutative error detection apparatus; a network connecting the plurality of nodes through the network interfaces of the nodes; a node fault detection apparatus comprising: a processor for performing node fault detection operations; memory for storing commutative error detection values; and a network interface connecting the node fault detection apparatus to the network, where the node fault detection apparatus processor performs at least the following node fault detection operations during first and second executions of multiple portions of an application program by the computing system, wherein during the first and second executions of the multiple portions of the application program a plurality of commutative error detection values are saved to the commutative error detection apparatus of the plurality of nodes when the nodes inject information generated during execution of reproducible segments of the multiple portions of the application program into the network, the node fault detection operations comprising: during the first execution and second executions of the multiple portions of the application program, retrieving the commutative error detection values from the commutative error detection apparatus associated with the plurality of nodes; saving the plurality of commutative error detection values associated with at least the first execution of the multiple portions of the application program to the node fault detection computer memory medium; and comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition. Further, if a node fault condition is detected, the faulty node can be identified as the one with the first difference in the commutative error detection values. Here, first means the node in which the difference has the smallest generation number.

A fifth alternate embodiment of the present invention comprises a node fault detection apparatus for use in a computing system, where the computing system comprises a plurality of nodes, where each of the nodes comprises at least a node processor, a node memory, a network interface and a commutative error detection apparatus; and a network connecting the plurality of nodes through the network interfaces of the nodes, the node fault detection apparatus comprising: processor means for performing node fault detection operations; memory means for storing commutative error detection values retrieved from the commutative error detection apparatus of the plurality of nodes; and network interface means connecting the node fault detection apparatus to the network of the computing system, where the processor means of the node fault detection apparatus performs at least the following node fault detection operations when the computing system executes a portion of an application program at least twice, wherein during each execution of the portion of the application program at least one commutative error detection value is generated and saved to a commutative error detection apparatus associated with at least one node of the plurality when data generated during execution of a reproducible segment of the portion of the application program is injected into the network by the at least one node, the node fault detection operations comprising: retrieving the at least one commutative error detection value created during a first execution of the application program from the commutative error detection apparatus of the at least one node; saving the at least one commutative error detection value from the first execution of the application program to the memory means; retrieving the at least one commutative error detection value created during a second execution of the application program from the commutative error detection apparatus of the at least one node; and comparing the at least commutative error detection value from the first execution of the application program to the at least one commutative error detection value from the second execution of the application program.

A sixth alternate embodiment of the present invention comprises a node fault detection method for identifying faulty nodes in a computing system using commutative error detection values, where the computing system comprises a plurality of nodes, where each of the nodes comprises at least a node processor, a node memory, a network interface and a commutative error detection apparatus; and a network connecting the plurality of nodes through the network interfaces of the nodes, and wherein node fault detection occurs when the computing system executes multiple portions of an application program at least twice, wherein during the first and second executions of the multiple portions of the application program a plurality of commutative error detection values are saved to the commutative error detection apparatus of the plurality of nodes when the nodes inject information generated during execution of reproducible segments of the multiple portions of the application program into the network, the method comprising: during the first execution and second executions of the multiple portions of the application program, retrieving the commutative error detection values from the commutative error detection apparatus associated with the plurality of nodes; saving the plurality of commutative error detection values associated with at least the first execution of the multiple portions of the application program to a computer memory medium; and comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition. Further, if a node fault condition is detected, the faulty node can be identified as the one with the first difference in the commutative error detection values. Here, first means the node in which the difference has the smallest generation number.

Accordingly, the foregoing embodiments of the present invention are operable in computing systems such as, for example, multiple node computing systems. In such systems, the methods and apparatus of the present invention save commutative error detection values such as, for example, checksums, when data associated with a reproducible portion of an application program is injected by a node into a network present in the computing system. Typically, the application program being executed by the computing system contains instructions to save commutative error detection values in commutative error detection apparatus associated with nodes comprising the computing system at specific times; for example, whenever reproducible portions of the application program are executed.

Node fault detection apparatus incorporated in the computing system at intervals retrieve and save into computer storage, such as memory, the commutative error detection values associated with a particular run of the application program. The retrieval and saving of commutative error detection values can be repeated when the application program is next executed. The node fault detection apparatus then compares commutative error detection values saved during the first run of the application program when a particular node injected data into the network of the computing system with either commutative error detection values saved during the second run of the application program when a particular node injected data into the network of the computing system, or commutative error detection values generated during the second run of the application program as the particular node is injecting data into the network of the computing system. The node fault detection apparatus detects a possible fault condition if there are differences in commutative error detection values associated with a particular segment of reproducible code between separate runs of the application program.

Thus it is seen that embodiments of the present invention overcome the limitations of the prior art. In particular, in the prior art, it was difficult to identify faulty nodes in a multiple node computing system. Such faulty nodes can cause calculations to be in error, and thus render invalid the results of an entire program execution.

Prior art diagnostic programs have proven sub-optimal because they frequently stress computer systems in a manner not encountered during execution of actual application programs. Thus, such diagnostic programs may mischaracterize faulty nodes as operating satisfactorily, or vice-versa.

In addition, diagnostic programs that do not take into consideration the discrete nature of multiple node computer systems may not be able to identify exactly where a fault condition originated. Fault conditions can spread rapidly throughout a multiple node computer system, so the diagnostic agency must be able to trace the fault condition to its point of origin in a particular node. Faults can also be non-reproducible. That is, repeating an application run that has suffered a fault can often lead to a run which does not have a fault. Diagnostic programs may not be able to account for such transient faults.

In contrast, the methods and apparatus of the present invention overcome the limitations of the prior art. In particular, the methods and apparatus of the present invention can be used during executions of application programs. Thus, there is no question as to whether a diagnostic program is mimicking conditions encountered during runs of actual application programs.

In addition, the present invention can identify exactly what portion of code caused a fault condition, since commutative error detection values—for example, checksums—can be saved throughout the execution of an application program whenever a reproducible portion of the application is executed. Tying commutative error detection values to particular portions of code provides a fault diagnostician with a pointer to the portion of code that caused the fault.

Further, the methods and apparatus of the present invention take into consideration the architecture of multiple node computer systems, and thus are much more accurate in localizing a fault condition to a particular node or nodes then the methods of the prior art. Since commutative error detection values associated with reproducible portions of computer program code can be saved whenever information is injected into the network by a particular node, fault conditions can be traced precisely to the node causing such a fault condition. Lastly, the methods and apparatus of the present invention easily find nodes which are suffering transient errors.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
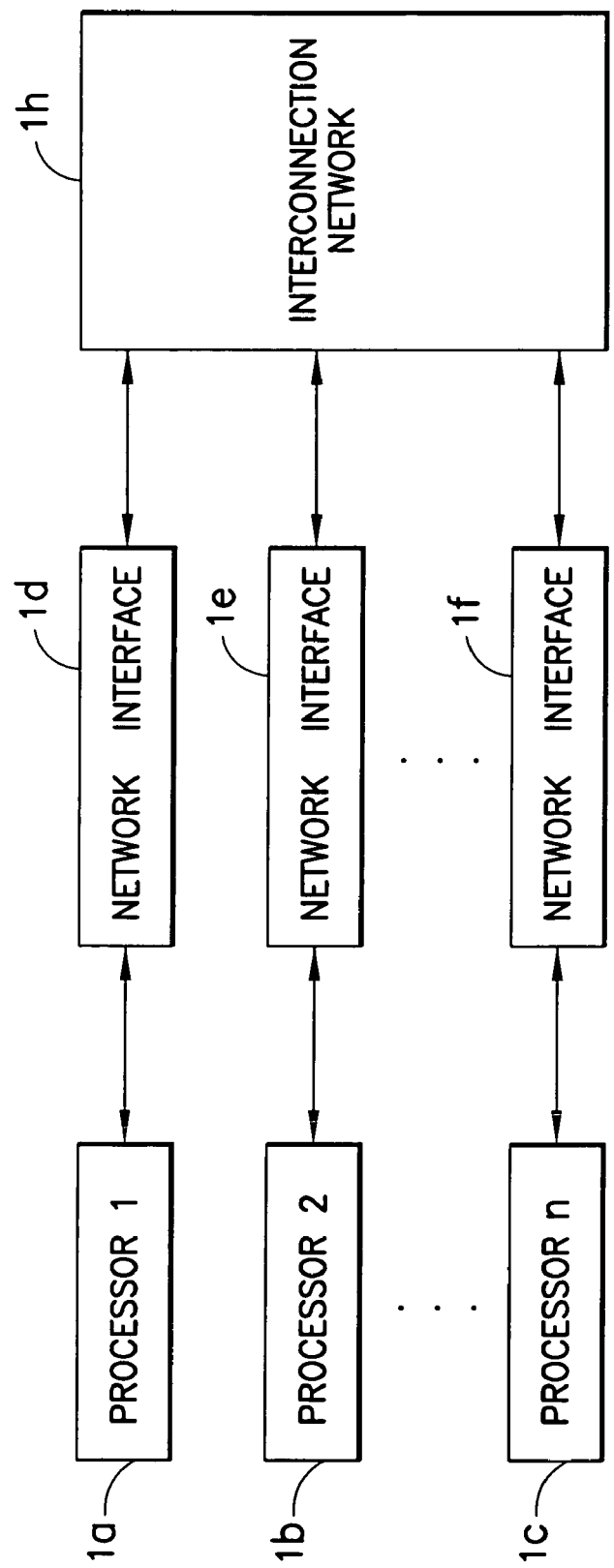
FIG. 1 depicts multiple processors that can communicate with one another via an interconnection network.

The methods and apparatus of the present invention provide a mechanism to identify and to isolate faulty nodes in a multiple node computing system. This is accomplished by taking signatures, specifically checksums, of all "reproducible" data that each node injects into the network connecting the nodes in the multiple node computing system.

These checksums are read and saved at appropriate times, thereby permitting comparisons of the checksums between different runs of the same application program. If the checksums differ, then it is a straightforward matter to identify the node on which a difference first appears. The node so identified is the faulty node. Not all applications will permit such reproducible comparisons across runs, however many scientific applications do. Such applications are termed reproducible, and the requirements for reproducibility will be described below.

The methods and apparatus of the present invention find use in a multiple node computing system consisting of tens of thousands of nodes. Each node contains at least a processor, memory and interfaces to one or more networks that interconnect the nodes. In addition, there are interconnection networks for transporting messages between nodes. Much of the logic for theses networks may optionally be integrated within the node itself (such as BlueGene/L), or may be separate from the nodes (such as Myrinet, or IBM Federation switches). The methods and apparatus of the present invention find use in either type of system.

Associated with each network interface is a checksum unit. The checksum unit is initialized to a known value (such as zero). Whenever a tagged byte, or group of bytes, flows through the network interface from the node into the network, the checksum is incremented by the byte or group of bytes (a word). Both the word and checksum may be of arbitrary width. If the checksum exceeds its maximum value (as determined by its width), the checksum rolls over. Since addition is commutative, the checksum does not depend on the order in which packets are injected. This property is essential since different runs of an application may have timing differences that cause reordering of injection times. Accordingly, error detection methods that are commutative—for example, checksums—need to be used in embodiments of the present invention. Furthermore, any commutative operator, not just addition, can be used for the purposes of fault identification and isolation. Examples of commutative operators are subtraction, multiplication, and exclusive-ors. Any such commutative operator may be used, but preferred embodiments use addition since it is simple to implement in hardware, and provides good error detection properties.

Not all bytes should be tagged. For example, packets associated with protocol messages (such as "clear to send" messages) between nodes are often dependent on timing and are not generally reproducible across multiple runs. Furthermore, it is desirable that packets be allowed to contain both tagged and un-tagged data. Thus there needs to be a simple, efficient mechanism to identify which bytes in a packet are tagged. In the BlueGene/L torus network, this is accomplished by specifying a starting byte to tag in every packet, or specifying that the entire packet should not be tagged. The BlueGene/L collective network has a similar mechanism.

Software operating in accordance with the present invention is responsible for appropriately tagging packets, and reading the injection checksums at appropriate times for comparison purpose. For example, in an MPI application, the MPI messaging layer should ensure that only the bytes in the data payloads are tagged. For the BlueGene/L torus network, this involves identifying where the payload of every packet starts, and if the payload is less than the packet length, ensuring that trailing bytes in the packet are all zeros (so as not to affect the checksum).

The checksums should be read and recorded at appropriate instances. In embodiments of the present invention, at least one node fault detection processor associated with the multiple-node computer and executing node fault detection operations in accordance with the present invention reads the checksums and saves them to at least one computer memory medium. The computer memory medium may comprise a random access memory, magnetic or optical disk storage, flash memory, a register of a processing unit, or any other memory media known to those skilled in the art. Since identifying the appropriate times is dependent on the application, it is up to the application to put in a call to read and record the checksums to be executed by the at least one node fault detection processor. Specifically, they should be recorded at "generation" times where a generation is defined as follows. The data contained in any message sent by a node in generation n, can only be affected by messages received in that node in generations prior to n. That is, a message sent in a generation n must not be affected by a message received by that node in generation n. For example, many scientific applications have the following (repeated) structure:

```
for (n=0; n<N; n++){
    compute( );
    send_messages( );
    receive_messages( ):
}
```

In the above code, the messages sent on iteration n are used by the other nodes on iteration (n+1). The checksums could be read and recorded after the send_message( ); if, in two different runs, the data sent on iteration n is always the same, then the application is reproducible (also known as deterministic). In order to uniquely identify a faulty node, the earliest generation time in which checksums differ must be identified. For this reason, all nodes must read and record checksums on every iteration, even if that node does not send or receive any messages in that iteration.

It may be that certain parts of a code are not reproducible. In such cases it is desirable to read the checksums before and after the non-reproducible portion but not report them. Any reports should only include the incremental checksum, i.e., the difference in checksums between two reads. The read values can be saved in buffers on the node, and only put out to disk as needed to prevent buffer overflows, at checkpoint times, or when the application terminates.

By doing so, a checksum history is created. If the checksum histories from two different runs of a reproducible application are different, then some node in the one of the computations was faulty. To identify which node is faulty, the checksum histories must be compared in more detail. A faulty node can be identified by comparing the checksum histories of two different runs of a reproducible application. If the histories are different, the faulty node is identified as that node where the histories first differ.

The methods and apparatus of the present invention will now be described in greater detail with reference to figures. FIG. 1 shows a multiple node computer system. In this system there are multiple processors 1a to 1c (FIG. 1 shows three processors, but there may be an arbitrary number of processors). These processors may be complete computers in their own right, including arithmetic logic units, memory and other peripheral devices such as disks. There is an interconnection network 1h that allows processors to communicate with one another. The interconnection network may be of arbitrary type, such as a torus as in IBM BlueGene/L, a fat tree such as in the High Performance Switch used in IBM SP systems, or a crossbar switch. Each processor has a network interface unit 1d to 1f. Data from a processor is placed into its network interface unit (either by the processor or by a DMA unit). When ready to send a packet (including when the data is ready and a network link is ready), data is moved from the network interface into the network. Similarly, when data reaches its destination in the network, it is placed in the network interface unit, and then moved to the processor (or the processor's memory).

There may actually be more than one interconnection network; if so, each network has its own network interface, which may be different depending on the type of network. BlueGene/L is an example of a system with multiple interconnection networks; BlueGene/L has a torus network and a collective network (plus several other networks which are not relevant to this invention). Furthermore, the processor, network interface and interconnection network are logical constructs and significant components of these units may be packaged on the same chip, such as in BlueGene/L.

Figure 2:
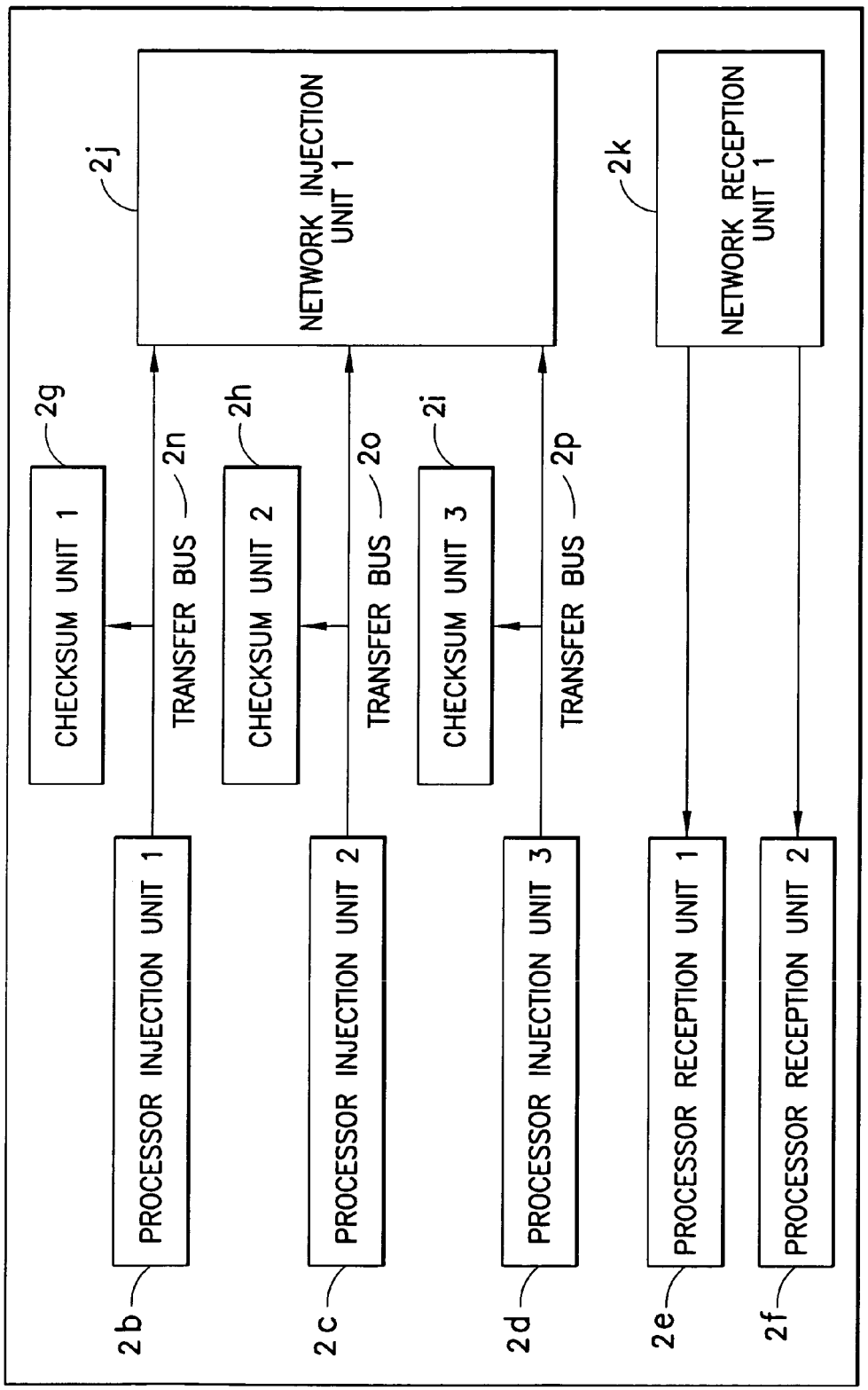
FIG. 2 depicts a high-level diagram of the network interface unit.

FIG. 2 shows a network interface unit in more detail. It consists of one or more processor injection units (2b to 2d). Associated with each processor injection unit is a checksum unit (2g to 2i), a network injection unit (2j), and a transfer bus between the processor injection unit and the network injection unit (2n to 2p). The network interface also has one or more processor reception units (2e to 2f) and an associated network reception unit (2k). The detailed workings of the reception path are not important for this invention. It should be understood that the number of processor injection units and processor reception units can vary.

The processor injection unit contains internal logic and memory, an interface or bus to the processor, and a bus to the network injection unit. When both the processor injection unit and the network injection units are ready to transfer data, the data flows over this bus. In BlueGene/L, the processor injection unit includes First-In First-Out queues (FIFOs); data is placed into a FIFO by the processor and then removed from the FIFO as it moves over the bus and enters the network. In other systems, a DMA engine may move data from the processor's memory to the processor injection unit.

As the data moves over the bus from the processor injection unit to the network injection unit, it is also fed into the checksum unit. For example, data flowing from Processor Injection Unit 1 2b to Network Injection Unit 1 2j over Transfer Bus 2n is fed into Checksum Unit 1 2g. Similarly, data flowing from Processor Injection Unit 3 2d to Network Injection Unit 1 2j over Transfer Bus 2p is fed into Checksum Unit 3 2i. The checksum unit has a checksum register that can be initialized and read by the processor. As the data enters the checksum it is added to the checksum register. The width of the data bus and the checksum register may be different. For example, in the BlueGene/L torus, the data bus is 8 bits wide and the checksum register is 32 bits wide; the 8 bits are conceptually expanded to 32 bits, with the 8 bits occupying the least significant bits and the other 24 bits being set to 0. On the BlueGene/L collective network, the data bus is 16 bits wide and the checksum register is 32 bits wide. The addition happens in parallel to the data movement, and does not slow or delay the movement of data from the processor to the network injection units. The addition is done so that carries from the most significant bit are simply dropped; for example, in BlueGene/L the addition is done modulo $2^{32}$. With this mechanism, all data injected into the network is added into a checksum register.

As described earlier, an application may not want all data added into the checksum. Therefore, there needs to be a mechanism to specify which bytes are included in the checksum. In BlueGene/L, this is handled somewhat differently for the collective and torus networks, because of different requirements. But the general concept is to encode information about which bytes to checksum in the header of the packets. How this general concept is embodied in the BlueGene/L torus and collective networks will now be described.

The hardware used by the BlueGene/L torus to accomplish the recording of checksums will now be described. This may easily be generalized. The network interface consists of some number N of injection FIFOs. In BlueGene/L, N=8. Processors write packets into the FIFOs, as needed and when space is available. Each FIFO has its own checksum unit. The checksum is 32 bits wide. BlueGene/L torus packets are from 32 to 256 bytes long, in multiples of 32 bytes. The first 8 bytes of every packet is the hardware header, used for routing inside the network. Inside the network, the first byte is used as a data packet identifier. It is set by the hardware as the packet flows out of the node from the injection FIFO into the network. When the processor injects a packet into the FIFO, it uses the first byte of the packet to specify checksum information. This first byte is used to tag torus packets, specifically to specify whether the packet should be checksummed and, if so, the starting byte number for the checksum. After this first byte passes the checksum unit, it is changed to become the packet identifier where it is used inside the network:

The first byte consists of [Csum_skip(7),Sk]. The first seven bits for this byte (called Csum_skip) determine the number of bytes in the packet to exclude from the checksum. Specifically, Csum_skip(7)=the number of 2-bytes to skip from the top of the packet before including the packet bytes into the running checksum of the FIFO where this packet is injected. For example, if Csum_skip=4, the first 8 bytes of the packet will not be included in the checksum. The $8^{th}$ bit determines whether or not to skip the entire packet. If the Sk bit is '0' then the packet is included in the checksum (according to the Csum_skip restriction). If this bit is '1' the full packet is not included in the checksum (independently of Csum_skip). If Csum_skip=b'0000000' and Sk='0' the whole packet is included in the checksum.

As packets are removed from the FIFO, each 8-bit byte is added to the 32-bit checksum associated with that FIFO.

In some applications or low-level messaging software, packets may be put in different FIFOs, even though the application is itself reproducible. In such a case the individual injection checksums are not reproducible across identical runs, although their sum is reproducible. Therefore, it suffices to record only the sum of all the injection FIFO checksums.

For the BlueGene/L collective network, there are 2 virtual channels. Each virtual channel has two injection FIFOs, one for packet headers and one for packet payloads. All BlueGene/L collective network packets have a 4-byte header and a 256-byte payload. For each virtual channel, the injection interface maintains a header checksum and a payload checksum (i.e., four checksums in total). Referring to FIG. 2, the collective network interface has four Processor Injection Units.

The checksum mechanism allows the user to specify whether a packet header is added to the cumulative header checksum, and what portion of a packet payload is added to the cumulative payload checksum on a per-packet basis. This is done by setting the "checksum control" field of the packet header to specify one of four modes:

Mode 1: Do not include the header in the header checksum. Do not include the payload in the payload checksum.

Mode 2: Include the header in the header checksum. Include the payload in the payload checksum with the exception of the first 16 bytes.

Mode 3: Include the header in the header checksum. Include the payload in the payload checksum with the exception of the number of 2-byte halfwords specified in a configuration register. The configuration register allows the specification of anywhere from 0 to 128 halfwords to exclude.

Mode 4: Include the header in the header checksum. Include the payload in the payload checksum.

For mode 3, there is a configuration register that allows the specification of 0 to 128 halfwords to exclude.

Adding or excluding the entire payload is easy to understand, but excluding only a portion of the payload requires some explanation. The hardware performs the payload checksum addition as data is read from a payload FIFO within a Processor Injection Unit and forwarded to the Network Injection Unit switch. This data is presented as halfwords (16 bits) and added to a 32-bit checksum. In one case (the integer addition reduction operation), the data of an entire packet is forwarded in reverse order (i.e. read from the FIFO backwards). A portion of the payload can be excluded from the checksum by specifying checksum mode 2 or 3 in the checksum control field of the packet header. Mode 2 causes exactly 16 bytes to be excluded, while mode 3 causes a programmable number of half-words to be excluded, as specified by a separate configuration register. When a portion of a packet is excluded from the checksum, the exclusion always occurs at the beginning of the transfer. With the exception of packets that specify the integer addition reduction operation, the exclusion occurs at the "most significant " end of the packet, or the portion injected earliest. This is appropriate for basic point-to-point messaging packets, which are expected to utilize the exclusion feature if they contain software headers within the payload. Such software headers are expected to be at the beginning of the packet (injected first).

Figure 3:
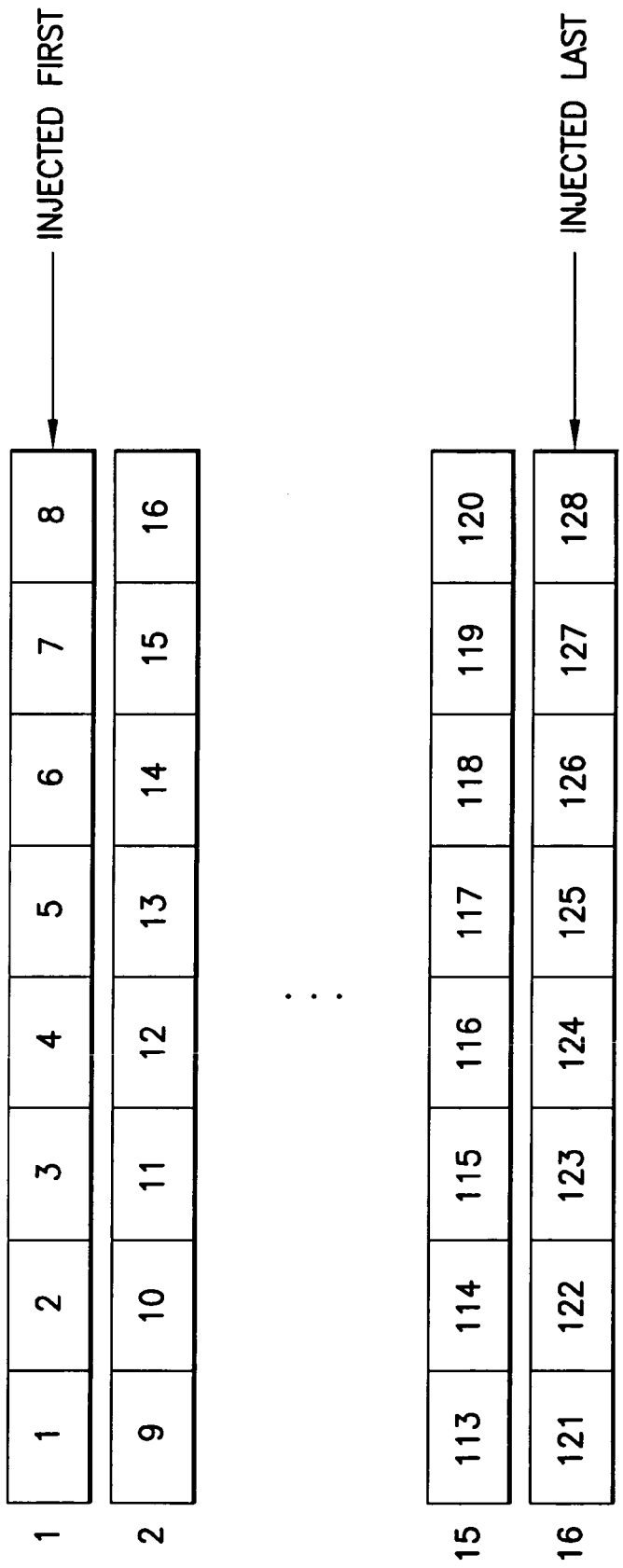
FIG. 3 shows word ordering for the collective network.
Figure 4:
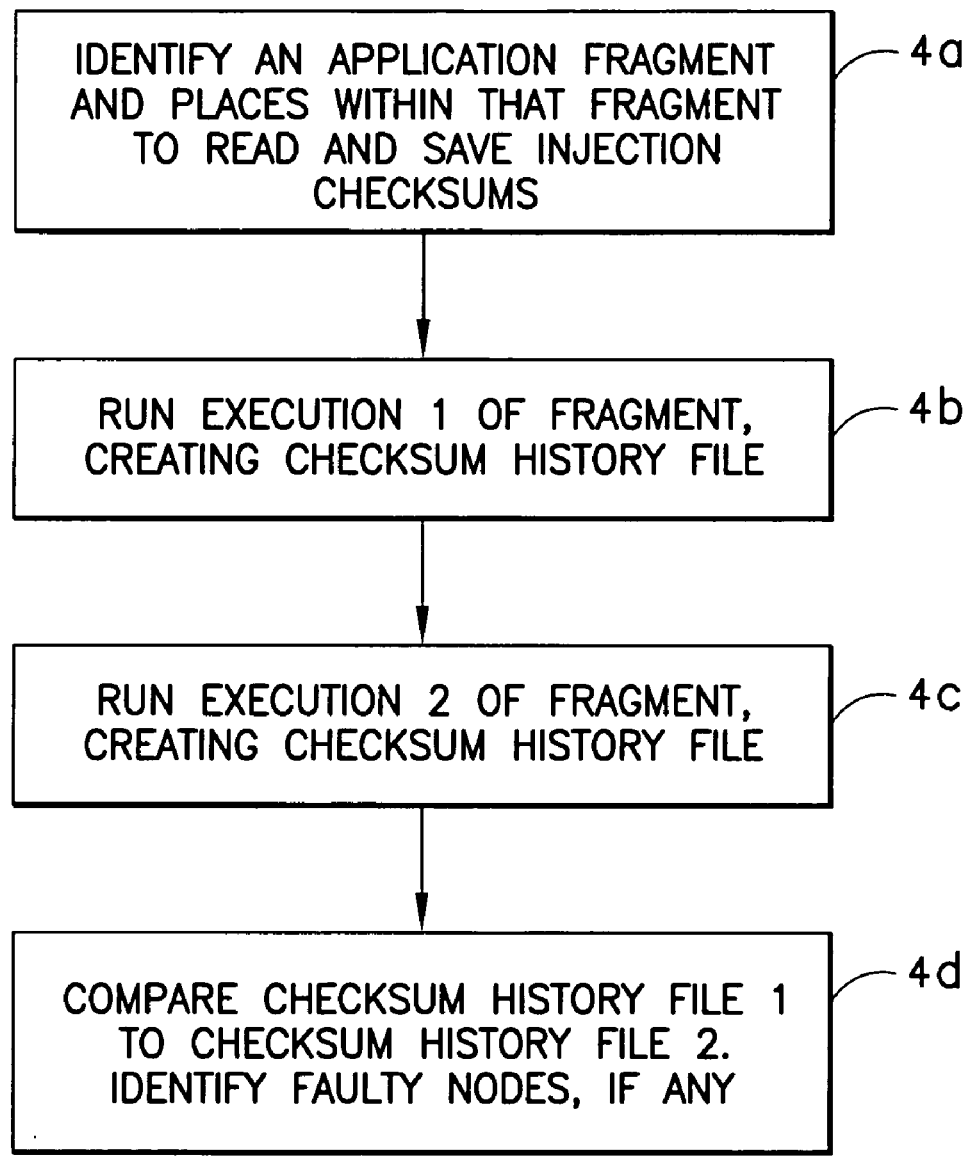
FIG. 4 shows off-line comparison of commutative error detection values.
Figure 5:
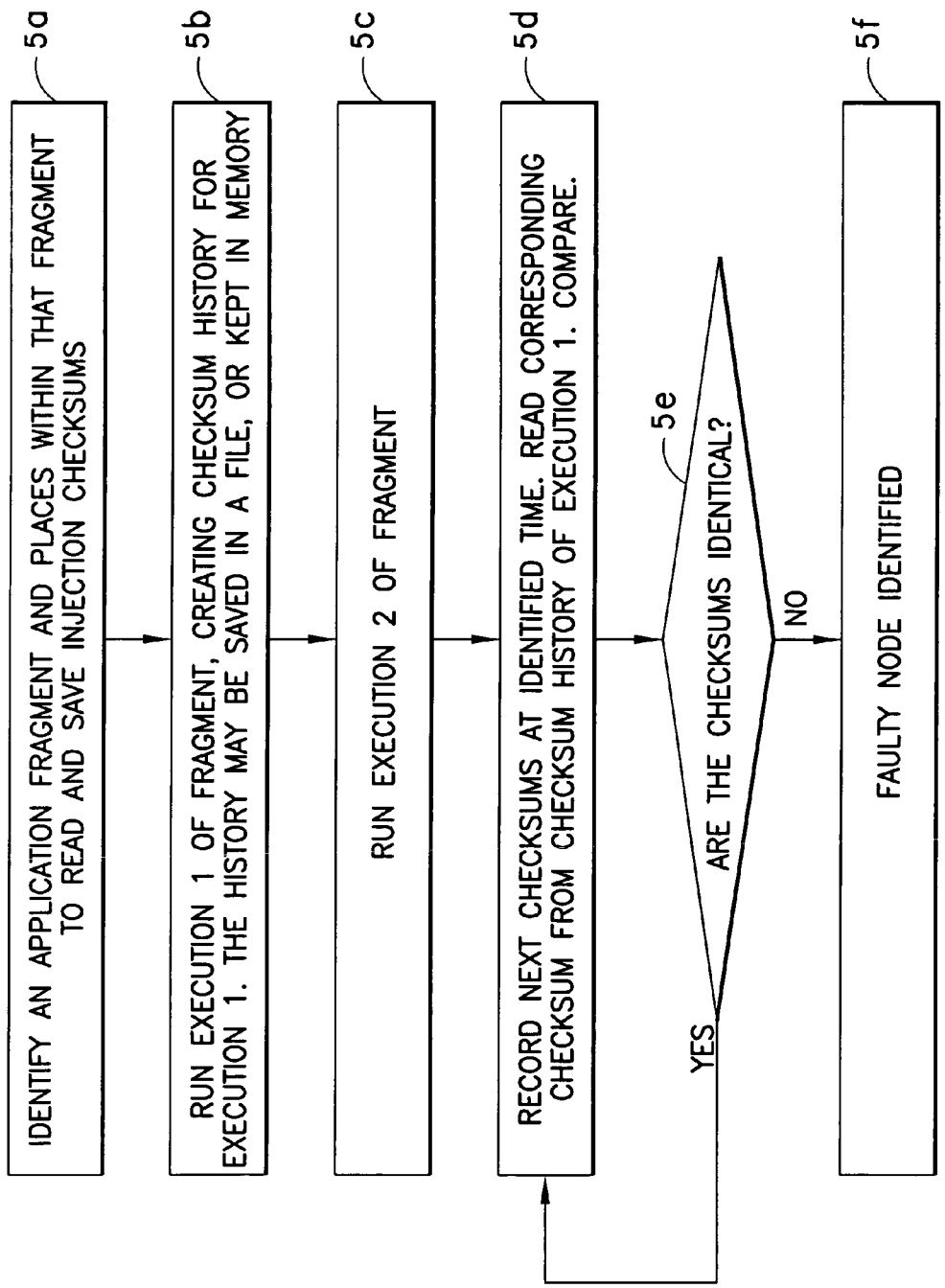
FIG. 5 shows on-the-fly comparison of commutative error detection values.

FIG. 3 shows how most payload data is handled by the hardware: the payload is injected by a processor or a DMA unit as a sequence of 16 "quadwords", where each quadword contains eight halfwords. It is then transferred a halfword at a time from the payload FIFO within the Processor Injection Unit to the Network Injection Unit. The numbers in the boxes indicate the order in which halfwords are transferred to the Network Injection Unit and hence, presented to the Checksum Unit calculator. Therefore, excluding a single halfword would exclude box number 1.

For addition reduction packets, the payload checksum exclusion occurs at the "least significant" end of the packet, or the portion injected latest. This is because addition reduction packets are actually read from the payload FIFO and hence, presented to the Checksum Unit, in reverse order. Referring to FIG. 3, when an addition reduction packet is transferred from a Processor Injection Unit to the Network Injection Unit, word 128 is read (and presented to the Checksum Unit) first. Word 127 is read second, and so on. Note here that the order in which the halfwords are presented to the Network Injection Unit and the Checksum Unit is inverted. So exclusion begins with the least-signifcant halfword of the quadword injected last (the least-significant halfword of the packet), and proceeds backwards to increasing significance.

Thus it is seen that the foregoing description has provided by way of exemplary and non-limiting examples a full and informative description of the best method and apparatus presently contemplated by the inventors for implementing node fault detection in multiple node computing systems using network injection checksums. One skilled in the art will appreciate that the various embodiments described herein can be practiced individually; in combination with one or more other embodiments described herein; or in combination with graphical advisors differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A signal-bearing computer memory medium tangibly embodying a program of machine-readable instructions executable by a digital processing apparatus to perform node fault detection operations in a computing system using commutative error detection values, where the computing system comprises a plurality of nodes, where each of the nodes comprises at least a node processor, a node memory, a network interface and a commutative error detection apparatus; the computing system further comprising a network connecting the plurality of nodes through the network interfaces of the nodes, and wherein node fault detection occurs when the computing system executes at least a portion of an application program at least twice, wherein during each execution of the portion of the application program at least one commutative error detection value is generated and saved to the commutative error detection apparatus associated with at least one node of the plurality when data generated during execution of a reproducible segment of the portion of the application program is injected into the network by the at least one node, the node fault detection operations comprising:

retrieving the at least one commutative error detection value generated during a first execution of the portion of the application program from the commutative error detection apparatus of the at least one node;

saving the at least one commutative error detection value associated with the first execution of the portion of the application program to a computer memory medium;

retrieving the at least one commutative error detection value generated during a second execution of the portion of the application program from the commutative error detection apparatus of the at least one node; and comparing the at least one commutative error detection value from the first execution of the portion of the application program to the at least one commutative error detection value from the second execution of the portion of the application program.

2. The signal-bearing computer memory medium of claim 1 where the node fault detection operations further comprise:

saving the at least one commutative error detection value from the second execution of the portion of the application program to a computer memory medium before comparing the at least one commutative error detection value from the second execution of the portion of the application program to the at least one commutative error detection value from the first execution of the portion of the application program.

3. The signal-bearing computer memory medium of claim 1 wherein comparing the at least one commutative error detection value from the first execution of the portion of the application program to the at least one commutative error detection value from the second execution of the portion of the application program occurs during the second execution of the portion of the application program after the at least one commutative error detection value from the second execution is generated, whereby if there is a difference between the at least one commutative error detection values a node fault condition is indicated.

4. The signal-bearing computer memory medium of claim 3 where the second execution of the application program is halted as soon as the node fault condition is detected.

5. The signal-bearing computer memory medium of claim 1 where the node fault detection operations further comprise:

detecting a fault condition in one of the nodes of the computer system when there is a difference between the at least one commutative error detection value associated with the first execution of the portion of the application program and the at least one commutative error detection value associated with the second execution of the portion of the application program.

6. The signal-bearing computer memory medium of claim 1 where the node fault detection operations further comprise:

determining that the at least one node is operating normally if there is no difference between the at least one commutative error detection value associated with the first execution of the portion of the application program and the at least one commutative error detection value associated with the second execution of the portion of the application program.

7. The signal-bearing computer memory medium of claim 1 wherein executing at least a portion of the application program comprises executing the entire application program.

8. The signal-bearing computer memory medium of claim 1 where the commutative error detection values comprise checksums.

9. A signal-bearing computer memory medium tangibly embodying a program of machine-readable instructions executable by a digital processing apparatus to perform node fault detection operations in a computing system using commutative error detection values, where the computing system comprises a plurality of nodes, where each of the nodes comprises at least a node processor, a node memory, a network interface and a commutative error detection apparatus; the computing system further comprising a network connecting the plurality of nodes through the network interfaces of the nodes, and wherein node fault detection occurs when the computing system executes multiple portions of an application program at least twice, wherein during each execution of the multiple portions of the application program a plurality of commutative error detection values are generated and saved to the respective commutative error detection apparatus associated with the plurality of nodes when data generated during execution of reproducible segments of the multiple portions of the application program is injected into the network by the nodes, the node fault detection operations comprising:

during the first execution and second executions of the multiple portions of the application program, retrieving the commutative error detection values from the commutative error detection apparatus associated with the plurality of nodes;

saving the plurality of commutative error detection values associated with at least the first execution of the multiple portions of the application program to a computer memory medium; and comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition.

10. The signal-bearing computer memory medium of claim 9 wherein comparing the plurality of commutative error detection values further comprises:

comparing sequences of commutative error detection values generated during the first and second executions of the multiple portions of the application program to determine when a first difference in commutative error detection values occurred between the first and second executions of the multiple portions of the application program; and tracing the fault to a particular node that generated the first difference in commutative error detection values.

11. The signal-bearing computer memory medium of claim 10 where the operations further comprise:

identifying which portion of the application program caused the first difference in commutative error detection values between the first and second executions of the multiple program portions.

12. The signal-bearing computer memory medium of claim 9 wherein comparing the commutative error detection values from the first execution of the multiple portions of the application program to the commutative error detection values from the second execution of the multiple portions of the application program occurs as the commutative error detection values are generated during the second execution of the multiple portions of the application program, whereby as soon as a first difference between commutative error detection values is detected a node fault condition is indicated.

13. The signal-bearing computer memory medium of claim 12 where the second execution of the multiple portions of the application program is halted as soon the node fault condition is detected.

14. The signal-bearing computer memory medium of claim 12 wherein the node generating the first difference in commutative error detection values between the first and second executions of the multiple portions of the application program is faulty.

15. The signal-bearing computer memory medium of claim 9 where the node fault detection operations further comprise:

saving the commutative error detection values from the second execution of the multiple portions of the application program to a computer memory medium before comparing the commutative error detection values from the second execution of the multiple portions of the application program to the commutative error detection values from the first execution of the multiple portions of the application program.

16. The signal-bearing computer memory medium of claim 9 where commutative error detection values are saved at generation times, where a commutative error detection value saved at generation n by a node is affected only by messages received from other nodes in generations earlier then generation n.

17. The signal-bearing computer memory medium of claim 9 where the application program contains instructions that specify when to save commutative error detection values to the commutative error detection apparatus of the plurality of nodes.

18. The signal-bearing computer memory medium of claim 17 where data injected by the plurality of nodes into the network is contained in data packets.

19. The signal-bearing computer memory medium of claim 18 where the data packets comprise header and data payload portions, and where the header portion contains instructions that a commutative error detection value should be calculated for at least a portion of the data packet.

20. The signal-bearing computer memory medium of claim 19 where the instructions indicate that a commutative error detection value should be calculated for at least a portion of the data packet header.

21. The signal-bearing computer memory medium of claim 19 where the instructions indicate that a commutative error detection value should be calculated for at least a portion of the data packet payload.

22. The signal-bearing computer memory medium of claim 9 where executing multiple portions of the application program comprises executing the entire application program.

23. The signal-bearing computer memory medium of claim 9 where the commutative error detection values comprise checksums.

24. A node fault detection apparatus for use in a computing system, where the computing system comprises a plurality of nodes, where each of the nodes comprises at least a node processor, a node memory, a network interface and a commutative error detection apparatus; and a network connecting the plurality of nodes through the network interfaces of the nodes, the node fault detection apparatus comprising:

at least one node fault detection processor for performing node fault detection operations;

a node fault detection computer memory medium for storing commutative error detection values retrieved from the commutative error detection apparatus of the plurality of nodes; and a network interface connecting the node fault detection apparatus to the network of the computing system, where the at least one processor of the node fault detection apparatus performs at least the following node fault detection operations when the computing system executes a portion of an application program at least twice, wherein during each execution of the portion of the application program at least one commutative error detection value is generated and saved to a commutative error detection apparatus associated with at least one node of the plurality when data generated during execution of a reproducible segment of the portion of the application program is injected into the network by the at least one node, the node fault detection operations comprising:

retrieving the at least one commutative error detection value created during a first execution of the application program from the commutative error detection apparatus of the at least one node;

saving the at least one commutative error detection value from the first execution of the application program to the node fault detection apparatus computer memory medium;

retrieving the at least one commutative error detection value created during a second execution of the application program from the commutative error detection apparatus of the at least one node; and comparing the at least commutative error detection value from the first execution of the application program to the at least one commutative error detection value from the second execution of the application program.

25. The node fault detection apparatus of claim 24 where the node fault detection operations further comprise:
saving the at least one commutative error detection value from the second execution of the portion of the application program to a computer memory medium before comparing the at least one commutative error detection value from the second execution of the portion of the application program to the at least one commutative error detection value from the first execution of the portion of the application program.

26. The node fault detection apparatus of claim 24 wherein comparing the at least one commutative error detection value from the first execution of the portion of the application program to the at least one commutative error detection value from the second execution of the portion of the application program occurs as soon as the at least one commutative error detection value from the second execution of the portion of the application program is generated, whereby if there is a difference between the at least one commutative error detection values a node fault condition is indicated and the portion of the application program need not be executed in its entirety the second time.

27. The node fault detection apparatus of claim 24 where the node fault detection operations further comprise:
detecting a fault condition in one of the nodes of the computer system when there is a difference between the at least one commutative error detection value associated with the first execution of the portion of the application program and the at least one commutative error detection value associated with the second execution of the portion of the application program.

28. A computing system using commutative error detection values for node fault detection, the computing system comprising:
a plurality of nodes, where each of the nodes comprises at least a node processor, a node memory, a network interface and a commutative error detection apparatus;
a network connecting the plurality of nodes through the network interfaces of the nodes;
a node fault detection apparatus comprising:
a processor for performing node fault detection operations;
a computer memory medium for storing commutative error detection values; and
a network interface connecting the node fault detection apparatus to the network,
where the node fault detection apparatus processor performs at least the following node fault detection operations during first and second executions of multiple portions of an application program by the computing system, wherein during the first and second executions of the multiple portions of the application program a plurality of commutative error detection values are saved to the commutative error detection apparatus of the plurality of nodes when the nodes inject information generated during execution of reproducible segments of the multiple portions of the application program into the network, the node fault detection operations comprising:
during the first execution and second executions of the multiple portions of the application program, retrieving the commutative error detection values from the commutative error detection apparatus associated with the plurality of nodes;
saving the plurality of commutative error detection values associated with at least the first execution of the multiple portions of the application program to the node fault detection computer memory medium; and
comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition.

29. The computing system of claim 28 wherein comparing the plurality of commutative error detection values further comprises:
comparing sequences of commutative error detection values generated during the first and second executions of the multiple portions of the application program to determine when a first difference in commutative error detection values occurred between the first and second executions of the multiple portions of the application program; and
tracing the fault to a particular node that generated the first difference in commutative error detection values.

30. The computing system of claim 28 wherein comparing the commutative error detection values from the first execution of the multiple portions of the application program to the commutative error detection values from the second execution of the multiple portions of the application program occurs as the commutative error detection values are generated during the second execution of the multiple portions of the application program, whereby as soon as a first difference between commutative error detection values is detected a node fault condition is indicated, and the execution of the multiple portions of the application program for the second time need not continue.

31. The computing system of claim 30 wherein the node generating the first difference in commutative error detection values between the first and second executions of the multiple portions of the application program is faulty.

32. The computing system of claim 28 where the node fault detection operations further comprise:
saving the commutative error detection values from the second execution of the multiple portions of the application program to the node fault detection apparatus computer memory medium before comparing the commutative error detection values from the second execution of the multiple portions of the application program to the commutative error detection values from the first execution of the multiple portions of the application program.

33. The computing system of claim 28 where the application program contains instructions that specify when to save commutative error detection values to the commutative error detection apparatus of the plurality of nodes.

34. The computing system of claim 33 where data injected by the at least one node into the network is contained in data packets.

35. The computing system of claim 34 where the data packets comprise header and data payload portions, and where the header portion contains instructions that a commutative error detection value should be calculated for at least a portion of the data packet.

36. The computing system of claim 35 where the instructions indicate that that a commutative error detection value should be calculated for at least a portion of the data packet header.

37. The computing system of claim 35 where the instructions indicate that a commutative error detection value should be calculated for at least a portion of the data packet payload.

38. A node fault detection apparatus for use in a computing system, where the computing system comprises a plurality of nodes, where each of the nodes comprises at least a node processor, a node memory, a network interface and a commutative error detection apparatus; and a network connecting the plurality of nodes through the network interfaces of the nodes, the node fault detection apparatus comprising:
processor means for performing node fault detection operations;
memory means for storing commutative error detection values retrieved from the commutative error detection apparatus of the plurality of nodes; and
network interface means connecting the node fault detection apparatus to the network of the computing system,
where the processor means of the node fault detection apparatus performs at least the following node fault detection operations when the computing system executes a portion of an application program at least twice, wherein during each execution of the portion of the application program at least one commutative error detection value is generated and saved to a commutative error detection apparatus associated with at least one node of the plurality when data generated during execution of a reproducible segment of the portion of the application program is injected into the network by the at least one node, the node fault detection operations comprising:
retrieving the at least one commutative error detection value created during a first execution of the application program from the commutative error detection apparatus of the at least one node;
saving the at least one commutative error detection value from the first execution of the application program to the memory means;
retrieving the at least one commutative error detection value created during a second execution of the application program from the commutative error detection apparatus of the at least one node; and
comparing the at least commutative error detection value from the first execution of the application program to the at least one commutative error detection value from the second execution of the application program.

39. The node fault detection apparatus of claim 38 where the node fault detection operations further comprise:
detecting a fault condition in one of the nodes of the computer system when there is a difference between the at least one commutative error detection value associated with the first execution of the portion of the application program and the at least one commutative error detection value associated with the second execution of the portion of the application program.

40. A node fault detection method for identifying faulty nodes in a computing system using commutative error detection values, where the computing system comprises a plurality of nodes, where each of the nodes comprises at least a node processor, a node memory, a network interface and a commutative error detection apparatus; and a network connecting the plurality of nodes through the network interfaces of the nodes, and wherein node fault detection occurs when the computing system executes multiple portions of an application program at least twice, wherein during the first and second executions of the multiple portions of the application program a plurality of commutative error detection values are saved to the commutative error detection apparatus of the plurality of nodes when the nodes inject information generated during execution of reproducible segments of the multiple portions of the application program into the network, the method comprising:
during the first execution and second executions of the multiple portions of the application program, retrieving the commutative error detection values from the commutative error detection apparatus associated with the plurality of nodes;
saving the plurality of commutative error detection values associated with at least the first execution of the multiple portions of the application program to a computer memory medium; and
comparing on a node-by-node basis the plurality of commutative error detection values associated with the first execution of the multiple portions of the application program to the plurality of commutative error detection values associated with the second execution of the multiple portions of the application program, where at least one difference in commutative error detection values between the first and second executions of the application program indicates a node fault condition.

41. The node fault detection method of claim 40 wherein comparing the plurality of commutative error detection values further comprises:
comparing sequences of commutative error detection values generated during the first and second executions of the multiple portions of the application program to determine when a first difference in commutative error detection values occurred between the first and second executions of the multiple portions of the application program; and
tracing the fault to a particular node that generated the first difference in commutative error detection values.

* * * * *